United States Patent
Chiles et al.

(10) Patent No.: US 6,581,157 B1
(45) Date of Patent: Jun. 17, 2003

(54) SYSTEM AND METHOD FOR DETECTING AND UPDATING NON-VOLATILE MEMORY ON AN ELECTRONIC ADAPTER BOARD INSTALLED IN A COMPUTING SYSTEM

(75) Inventors: David C. Chiles, Mitchellville, MD (US); Roderick J. Bartlett, Herndon, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/299,447

(22) Filed: Apr. 26, 1999

(51) Int. Cl.[7] ................................................ G06F 9/00
(52) U.S. Cl. .................................. 713/1; 713/100
(58) Field of Search ........................ 713/1, 2, 100; 717/11

(56) References Cited

U.S. PATENT DOCUMENTS

| 5,623,604 A | * | 4/1997 | Russell et al. ............... 395/712 |
| 5,657,448 A | * | 8/1997 | Wadsworth et al. .......... 709/220 |
| 5,867,714 A | * | 2/1999 | Todd et al. .................. 395/712 |
| 5,890,014 A | * | 3/1999 | Long ............................. 710/8 |
| 6,330,715 B1 | * | 12/2001 | Razzaghe-Ashrafi ......... 717/11 |

* cited by examiner

*Primary Examiner*—Dennis M. Butler
(74) *Attorney, Agent, or Firm*—McDonnell Boehnen Hulbert & Berghoff (57) ABSTRACT

A system for updating a non-volatile programmable memory in a device in a computing system with little or no user intervention. During initialization, a device driver is initialized. During initialization, the device driver checks the device version and compares the device version with an expected, updated device version. If the device needs to be updated to operate with the device driver, a memory image of the non-volatile memory in the updated device version is downloaded, or programmed into the non-volatile memory of the device. Before the device version is checked, the user may be queried as to whether to proceed with the upgrade. If the user responds in the negative, the upgrade may be performed using a graphical user interface (GUI) configuration application. The GUI configuration application checks the device version and updates the non-volatile memory with the update device version.

26 Claims, 5 Drawing Sheets

SYSTEM AND METHOD FOR DETECTING AND UPDATING NON-VOLATILE MEMORY ON AN ELECTRONIC ADAPTER BOARD INSTALLED IN A COMPUTING SYSTEM

BACKGROUND OF THE INVENTION

A. Field of the Invention

The present invention relates to the field of computers and, more particularly, to the field of systems and methods for configuring and updating electronic adapter boards. Electronic adapter boards are devices that operate in conjunction with device drivers to enhance the functional capability of a computer. Electronic adapter boards include no-nvolatile memory components that store digital information identifying the boards according to device versions. Different device versions may include different features and functions. During operation, the device drivers function with specific device versions of the electronic adapter board.

As described in detail below, the digital information in the non-volatile memory is updated in a device upgrade to conform to the specific device version used by the device driver. For example, the present invention provides automatic and user-controlled device upgrade capability precluding the need to replace the electronic adapter board when new device versions become available.

B. Background of the Invention

Computing systems such as personal computers and computer workstations may be configured to perform specific functions or to operate in a manner desired by a user. The user may select different computer programs that provide a computing system with different applications. The user may also connect various devices to the computing system's input/output system to provide various ways for a user to interact with the computer as well as to expand the functional capacity of the system. Such devices provide the system with added functions such as expanded memory (i.e. plug-in memory boards, disk storage interface, etc.), communications capability (i.e. modems, network cards, etc.) and multimedia functions (i.e. sound cards, graphics device interfaces, etc.).

As the computer industry has evolved, standard interfaces have emerged to help ease the development of hardware and software systems that enhance the functions available on computers. For example, standard bus interfaces, such as the Personal Computer Memory Card International (PCMCIA), provide standard bus connectors that require cards, or circuit boards, to connect to the bus in the same way.

The devices may include a memory system having non-volatile programmable memory for storing resident programs, or firmware, that may execute using a resident processor. A resident processor is a processor that is installed on the device, or operates local to the device and independently of the central processor of the computer. The resident processor and the device firmware may provide a complete bootable computing environment. The programs in the firmware comprise an embedded system that may include an embedded operating system and function code for performing the various functions of the device. The non-volatile memory may also include data that may be accessed by the central processor of the computer.

The operating system, programs and/or data stored in the non-volatile memory of the device may be referred to as a memory image of binary information that is stored in the non-volatile memory. When a change is made to the programs that perform the functions of the device, the programmer first changes the program's source code. The source code is then compiled and linked with the other programs and/or data in the embedded system to produce the memory image that is programmed, or "burned", into the non-volatile memory. The term "image" is used by those of ordinary skill in the art to refer to the pattern of one's and zero's stored in the non-volatile memory each time the device is programmed. Types of non-volatile memory that may be used to store the image include electrically-erasable programmable read-only memory, a flash memory, or any other memory that retains the data it stores whether power is applied to it or not.

Devices are typically controlled by software device drivers that operate under the control of the operating system of the computer. Software drivers include a device initialization function and a device interface that allows a system to configure and use the device. The system uses the device by sending commands or messages from programs operating under the central processor of the computer. Depending on the type of functions performed by the device, standard interfaces may exist to simplify the development and operation of such devices. For example, software device drivers for controlling a modem may be invoked using a standard I/O system that is typically included in the operating system to perform communications functions. A further standard interface may be provided by communications protocol drivers that may be used by applications, such as World-Wide Web browsers to communicate over the Internet.

Manufacturers of devices that enhance a computer's functions may distribute such devices in the form of cards, or circuit boards that connect into the computing system's bus system. In addition, the cards may be distributed with software drivers, or may be designed to operate with software drivers that provide program control of the devices to the software comprising the computing system's applications. The user may install software drivers in the computer's software system as part of the procedure used to install the card into the computing system's bus system. When the card has been connected to the bus and the software driver has been installed, the device is presumably capable of operating according to its intended function.

Device drivers are typically easy to update to include added features because they operate under operating system control. Manufacturers take advantage of this capability by simply updating the device driver to add features. The device drivers are also easy to distribute. Upgraded device drivers may be distributed by mail on floppy disks, or by a download from a remote source provided by the manufacturer or product distributor. The remote source may offer the device driver on a web page or on a computer that is capable of a point-to-point connection.

Such updates, however, are limited by the hardware and firmware that is already available on the card. In order to update the hardware and firmware of a card with hardware changes, it must be replaced.

It would be burdensome and expensive for a customer to replace a card and its accompanying software to for what may be a simple update. Moreover, if an update is needed to correct a problem or defect, the manufacturer may have to absorb the cost. If the product is a card that has sold successfully, a large number of cards may need to be replaced.

Much of the functional capability of the card is provided by the firmware resident on the card. Significant updates of the functional capability of a card may be achieved by updating the software driver and the memory image in the non-volatile memory. For example, a modem manufacturer may sell a large number of digital modem cards that include an embedded processing system that does not support interrupt processing. By changing the embedded code in the non-volatile memory of the modem card, a digital modem having the same hardware may be updated to support interrupts such that an improvement in throughput may result.

It would be desirable to provide a system or method to update the image in the non-volatile embedded memory in a device without having to replace the device.

One way for manufacturers to provide customers with a way to update the image in the non-volatile memory is to provide an Internet site having file transport protocol capabilities. Customers can connect to the site and follow instructions for downloading an updated image. Such a system for providing updates is subject to user error. In cases where the update involves a large image, the process may be time-consuming, particularly when Internet traffic is high.

It would be desirable to provide a way for customers to update non-volatile memory images automatically with little or no user intervention.

The present invention solves these problems by automatically updating a memory image in non-volatile memory. When a device has been modified by a manufacturer, uses of previous versions of the device may enjoy the benefits of new features available on the modified device by installing an upgraded device driver. The upgraded device driver automatically updates the memory image in non-volatile memory, or provides a system for updating the memory image under user control.

SUMMARY OF THE INVENTION

In view of the above, a method for updating a memory image in a non-volatile programmable memory in a device in a computing system is provided. The method initializes a device driver for controlling the device, preferably during system initialization. A device version of the device is detected in the device to determine if the device version is an updated device version. The memory image in the non-volatile programmable memory is updated to store the memory image of the updated device version.

In a further aspect of the present invention, a system for updating a non-volatile programmable memory in a device in a computing system with little or no user intervention is provided. According to the present invention, the system includes a memory image in the non-volatile programmable memory of the device. The memory image includes resident data used by the device to perform a plurality of device functions. A device type identifier is included to identify the device as being one of a plurality of device types including an updated device having an updated device type identifier. A device type identifier is assigned to the device as its manufacturer releases the device as a product. Each subsequent product release is assigned the updated device type identifier. The memory image is an updated image when the device type identifier matches the updated device type identifier. The system also includes a copy of the updated image stored in the memory medium of the computing system.

A device driver is also stored in the memory medium of the computing system. The device driver controls the device when the memory image is the updated image. A version manager having a device version detector for detecting whether the device version matches the updated device version. A memory image converter is included for incorporating the updated image in the non-volatile programmable memory when the device version does not match the updated device version.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

Figure 1:
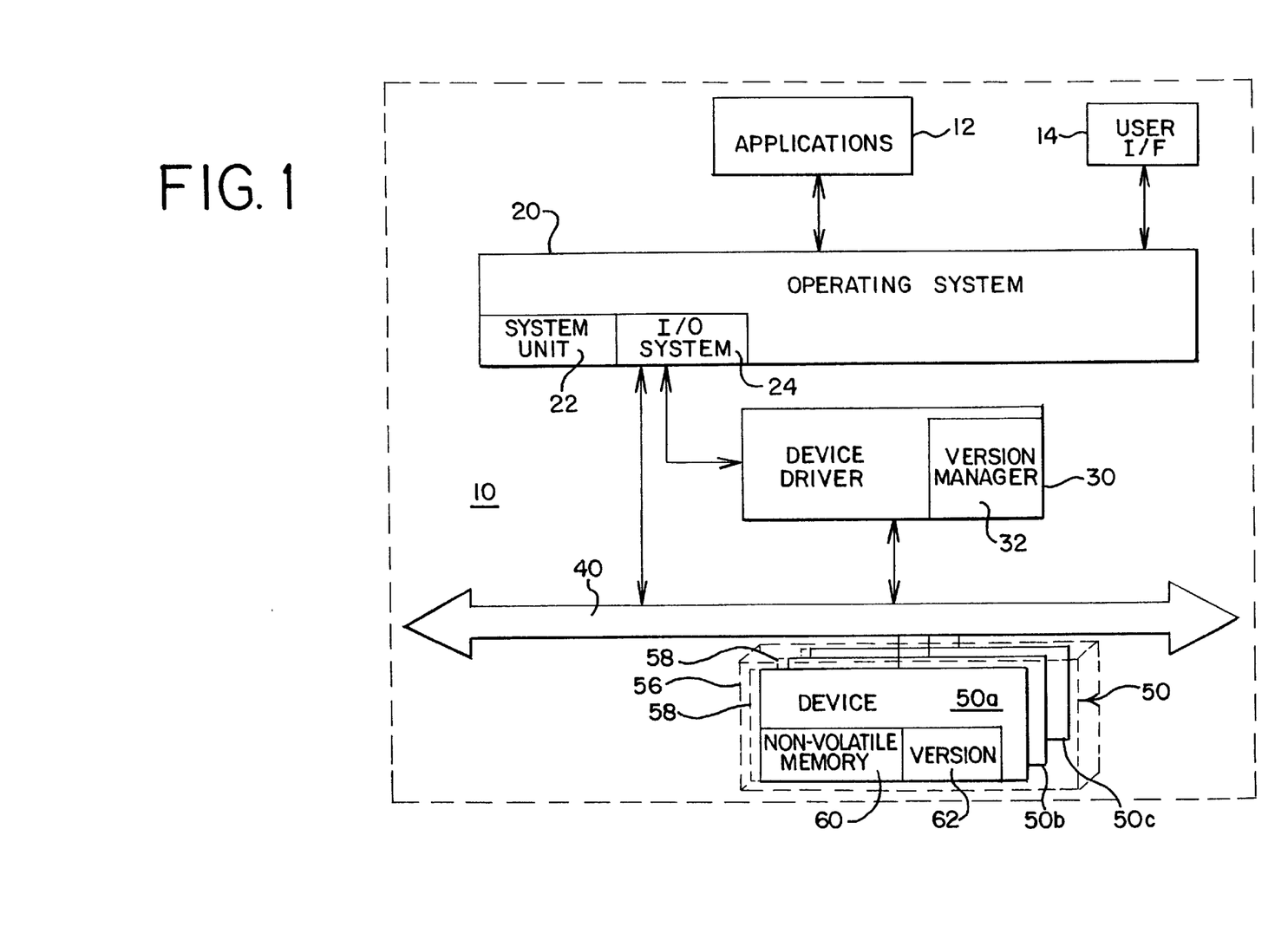
FIG. 1 is a block diagram of a representative computing system of a type in which embodiment of the present invention find advantageous use.

FIG. 1 is a block diagram of a computing system 10 of the type in which embodiments of the present invention find advantageous use. The computing system 10 is a general-purpose computing platform such as a personal computer or a computer workstation that users may configure to perform selected functions. In addition to a processing unit and memory (not shown), the computing system 10 includes basic computing sub-systems such as, a user interface 14, an operating system 20 and an interconnection system 40. These sub-systems are computing resources that are basic to most computing systems. The computing system 10 may be configured for specific uses by the addition of applications 12 and devices 50.

Users add applications 12 and devices 50 to add the capability to perform computer-based tasks in a business, home, or other environment in which a personal computer may be useful. The applications 12 provide the computing system 10 with added functional capability through software. The devices 50 provide added functional capability through hardware and may include a first device 50a, a second device 50b and a third device 50c. In a typical computing system, the first device 50a may include a communications device (e.g. a modem, a network adapter card, a digital subscriber line adapter card), the second device 50b may include a multi-media card (e.g. a graphics card, a sound card, etc.), and the third device 50c may include an auxiliary storage device (e.g. compact disc drive, hard disk drive, portable disk drive, etc.).

The basic computing sub-systems manage, control and support the applications 12 and devices 50 that enhance the functional capability of the computing system 10. Computer system developers typically build the basic computing sub-systems as open systems and provide sufficient information about the systems to enable other developers of computing equipment to develop applications 12 and devices 50. In this manner, applications developers and device developers having broad ranges of expertise may develop and distribute computer products that provide specific functional capability to general-purpose computers.

Users may obtain commercially available applications 12 and devices 50 to configure the computing system 10 to perform selected functions. Applications 12 are computer programs that perform defined functions and may have access to a user interface system 14 on the computing system 10. The user interface system 14 provides a user with access to the functions performed by the application 12 via input and output devices such as a keyboard, a display screen, a printer, etc. Typical applications 12 include word processors, spreadsheets, database managers, browsers, games, etc.

Users may connect the devices 50 to the computing system 10 according to the interface provided by the developer of a particular interconnection system 40. The interconnection system 40 may include a local bus comprising an address bus, a data bus, a local I/O bus and a control bus used for communicating with the processor unit. The local bus may connect to the devices 50 directly by implementing the devices 50 as components (e.g. ASIC, or application specific integrated circuits) mounted on a circuit board. The devices 50 may also be implemented as circuit boards connected to the local bus via a connector.

The interconnection system 40 may also include a peripheral bus mounted on a chassis 56 having a series of card slots 58. The devices 50 may be implemented as circuit cards having an interface designed for the card slots 58 on the peripheral bus. Users may add devices 50 to the peripheral bus by exposing the chassis and plugging the card into an open card slot.

The interconnection system 40 may also include a panel of connectors that are accessible to the user. The user may plug devices 50 to open connectors on the panel according to their type. For example, an external modem may include a telephone wire with a male RJ11 telephone jack for connecting to a female RJ11 telephone jack on a connector panel on the computing system 10.

In a preferred embodiment, the interconnection system 40 includes the PCMCIA bus structure commonly used in computers that use the Windows™ operating system.

Devices 50 that are added to the computing system 10 include a non-volatile memory (NOV) 60 and may also include a processing system (an example of which is described with reference to FIG. 3). For example, the device 50a may be a modem that includes a microprocessor or a digital signal processor that performs tasks using programs stored in the non-volatile memory 60 to carry out the communications functions of the modem.

The non-volatile memory 60 may include one or more non-volatile read-only devices that contain computer programs, data, or both. The non-volatile read-only devices that may be used include electrically erasable programmable read-only memory (EEPROM), field programmable gate arrays (FPGA), and a flash memory device.

The device 50a may be controlled by applications 12 using a device driver 30, which is a software component that provides an interface to the device 50a. The device driver 30 may include a library, or a set of calls, commands or procedures that may be used by applications 12 and other software components to invoke functions that use the device 50a. For example, a browser may invoke the device driver 30 of the modem to perform a send data command that sends data over a communications link such as a data connection on a telephone line.

The operating system 20 manages the computing resources and provides an interface to the resources for use by computer programs that execute on the computing system 10. The operating system 20 includes a system initialization procedure 22, an input/output (I/O) system 24, and software resources, such as libraries and utilities that allow programs to access memory resources, input/output resources and other available computing resources. Examples of commercially available operating systems that may be used in a preferred embodiment include any Microsoft Windows™ operating system, Macintosh™, Unix, Linux, etc.

The I/O system 24 provides a program interface to hardware devices such as disk drives, memory components, and other devices 50 connected to the interconnection system 40. I/O systems 24 are well-known in the art and therefore require no further description.

The system initialization procedure 22 performs any initialization functions that may be required to allow the applications 12 and devices 50 to operate. The system initialization procedure 22 begins operation when the computing system is provided with power, or when the system is otherwise reset. The system initialization procedure 22 preferably may be modified to allow for the addition of applications 12 and devices 50 that are initialized during system startup. For example, during installation of the device 50a, the system initialization procedure 22 may be modified to include an invocation to an initialization routine for the device 50a. The system initialization procedure 22 may be modified manually such as, for example, by editing an initialization file to include a call to the initialization routine. The system initialization procedure 22 may also be modified automatically by a program that performs the installation tasks of the device 50a.

Applications developers may distribute applications 12 to users by direct download on a data connection to a remote source. The Internet has become one popular medium for achieving such downloads. Applications developers may also distribute the applications 12 on a portable storage device such as a compact disc (CD) or a floppy disk. Programs called 'installers' provide a user with a window or menu driven process of installing applications 12. Such installers help to minimize user frustration and the potential for user error. The installers may modify the system initialization procedure to insure that the applications 12 will be properly initialized during system initialization.

Device developers typically distribute the device 50a and the device driver 30 together as a product, although updates to the product may be distributed with or without the device 50a. Developers typically continue to support the products through revisions to the product design. Each revision is released as a different device type having a device type identifier. The device type identifiers identify the updates to a product as versions, models (with model numbers), variants, or modifications of each preceding released product. Whereas a serial number uniquely identifies each individual device, a device version identifies the device, the device driver and any other component in the product as a member of a class of devices having the same features, functions and even defects.

The device 50a may include number, symbol, or name that represents a device version 162 that may be maintained in a storage location in the non-volatile memory 60 to identify the version of the device 50a. Each succeeding version of the device may contain new features, functions, corrections to defects in past versions, or other improvements to the product. When a version is released, the developer has updated the product and the latest version is an updated device version. The updated device version is accessible to the program logic of the device driver 30, preferably in a memory location maintained by the device driver 30.

Developers typically make an effort to implement product improvements in the device driver 30. Software is generally less costly and easier to modify and distribute than hardware. The implementation of improvements in the device driver 30 also spares the user from the added cost and burden of replacing hardware components.

Nevertheless, it may be desirable or necessary to modify the device 50a. The modifications to the device 50a may entail modifications to the hardware. In addition, devices 50 that include a processing system and a memory system may be modified by changes to the computer programs or the data in the non-volatile memory 60.

The computer programs or data in the non-volatile memory 60 is a memory image comprising data used by the device to perform functions. A memory image is binary information that is stored in the non-volatile memory. The term "image" is used by those of ordinary skill in the art to refer to the pattern of one's and zero's stored in the non-volatile memory each time the device is programmed. A device 50a that has been updated to the updated device version includes an updated device image. The updated device image is preferably compatible with the device driver 30. Because the device driver 30 invokes the functions of the device 50a, incompatibility between the device driver 30 and the device 50a may lead to erroneous operation.

The device driver 30 in FIG. 1 advantageously manages the compatibility between the device driver 30 and the device 50a using a version manager 32. The version manager 32 is a program or a set of software components that operates to maintain, or access, a copy of the updated memory image for the non-volatile memory 60 in the device 50a. The copy of the updated memory image corresponds to the updated device version expected by the device driver 30 for operation with the device 50a. The version manager 32 includes software components for performing functions for determining whether the device version is up to date and for updating the device to bring it up to date when it is not up to date.

During system initialization, the version manager 32 determines the version of the device 50a by retrieving the device version 62 in the non-volatile memory 60 of the device 50a. The version manager 32 compares the device version 62 with the updated device version, stored in the device driver 30 memory. If the device version 62 of the device 50a is not the same as the updated device version, the device driver 30 converts the memory image in the non-volatile memory 60 of the device 50a to the updated memory image. The conversion to the updated memory image may be carried out by performing a memory programming process according to the type of non-volatile memory 60 used in the device 50a. Such programming processes for types of nonvolatile memory 60 such as erasable programmable read-only memory, electrically erasable programmable read-only memory, flash memory and field programmable gate arrays are well known to those of ordinary skill in the art and therefore, require no further description.

The system for updating the device 50a described for the computing system 10 in FIG. 1 advantageously allows device developers to distribute updates by distributing the updated device driver 30 without requiring users to replace the device 50a. In addition, the system operates automatically and requires little or no user intervention.

Figure 2:
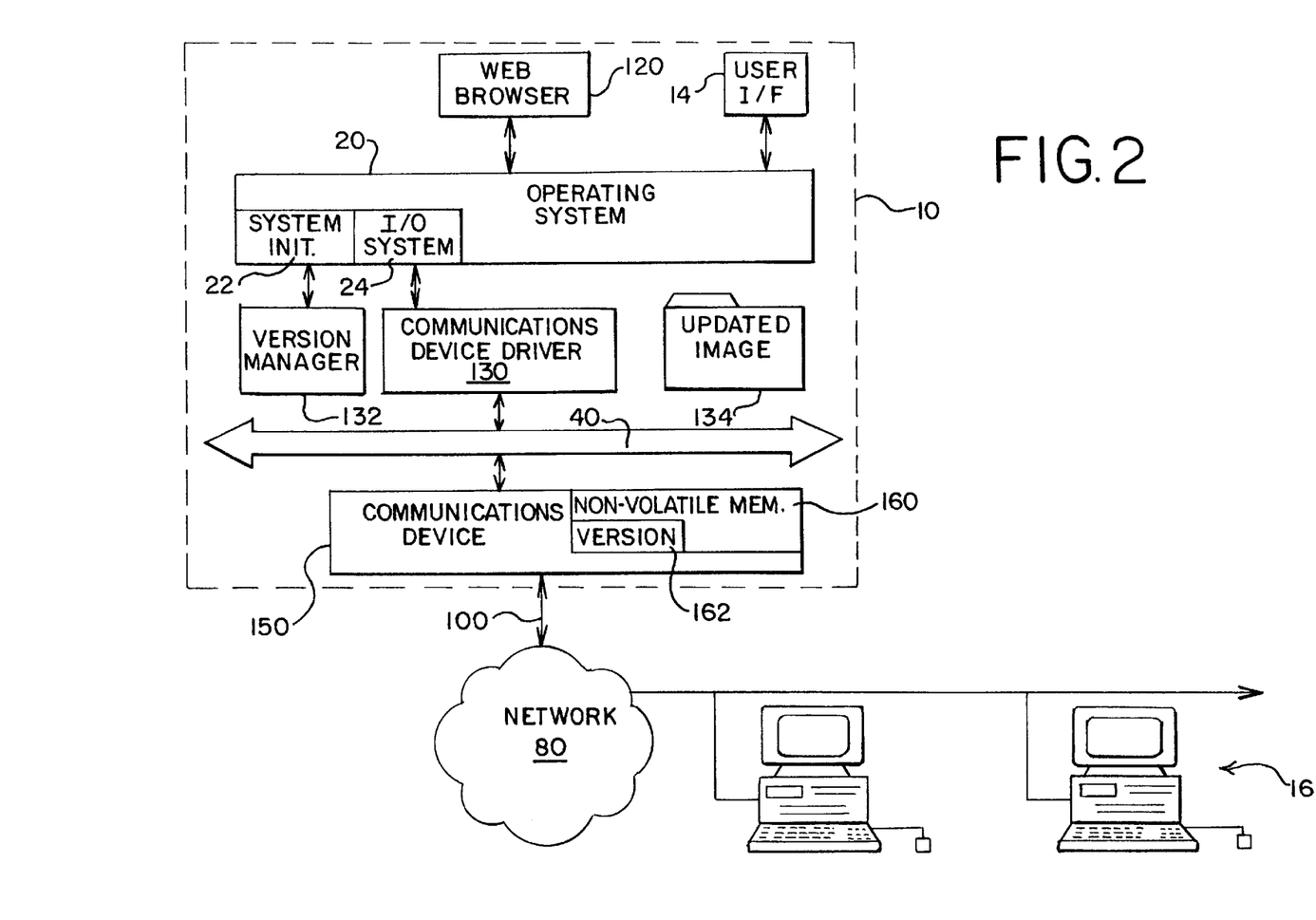
FIG. 2 is a block diagram of the computing system of FIG. 1 in which the computing system includes a communications device for connecting the computing system to a networks.

The system described for the computing system 10 in FIG. 1 may be used with any type of device 50 that may be connected to the interconnection system 40. FIG. 2 shows a computing system 10 having a communications device 150 connected to the interconnection system 40. The communications device 150 is used by a web browser 120 to connect to a network 80, such as the Internet, to communicate with web pages on computers 16 connected to the network 80. Examples of devices that may be used as the communications device 150 include modems and network interface adapters, or cards, that operate according to selected protocols, standards or other scheme for communicating over the network 80. Examples of network interface adapters include Ethernet cards, token ring adapters, digital subscriber line adapters, ISDN adapters, etc.

A communications device driver 130 executes communications commands that use the communications device 150. Program steps that invoke the communications device driver 130 may be included in the web browser 120 and in any other application that uses the communications device 150. The communications device driver 130 may include or have access to a version manager 132 for managing version compatibility between the communications device 150 and the communications device driver 130. The version manager 132 is preferably called during the system reset by the system initialization procedure 22. The version manager 132 may include a user query that permits the user to select whether to check the version compatibility.

The communications device driver 130 may include the version manager 132 as a component that is integral to it in the computing system 10. Alternatively, the version manager 132 may be installed in the computing system 10 such that it is available to other programs or device drivers that may encounter version compatibility issues with a device.

The version manager 132 may also include a system and method for checking the version compatibility using the user interface 14 of the computing system 10. A copy of the updated image 134 may be included in a file stored in the memory storage of the computing system 10. The version manager 132 checks a device version 162 in a non-volatile memory 160 in the communications device 150. When the version manager 132 detects the device version 162 that is different from the updated device version, the updated image copy 134 is accessed to update the memory image of the communications device 150.

Figure 3:
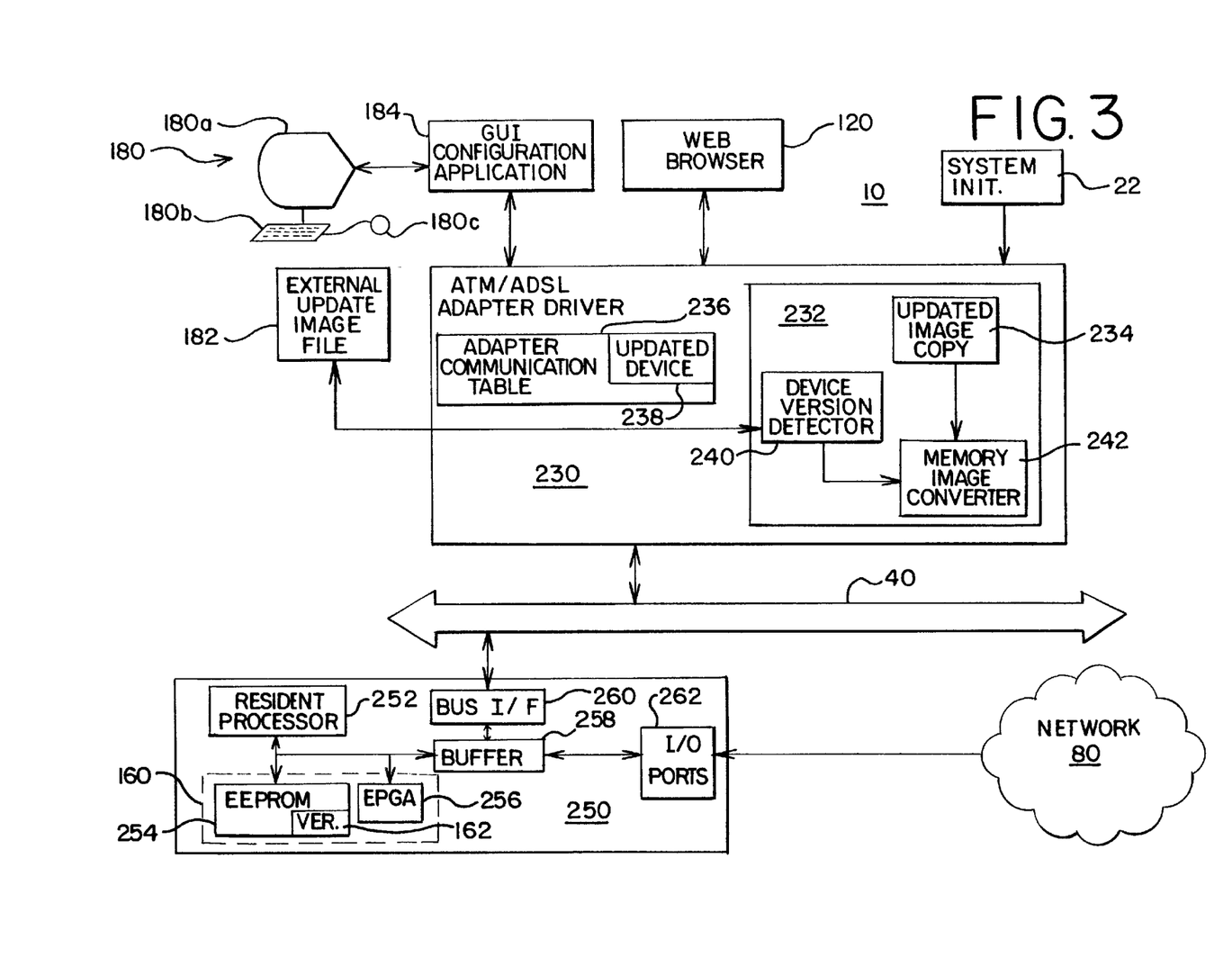
FIG. 3 is a block diagram of the computing system of FIG. 1 according to a preferred embodiment of the present invention.

FIG. 3 shows the computing system 10 of FIG. 2 in which the communications device 150 is an asynchronous transfer mode/asynchronous digital subscriber line (ATM/ADSL) adapter 250 according to a presently preferred embodiment of the present invention. The ATM/ADSL adapter 250 operates using an ATM/ADSL adapter driver 230 and includes a system for updating the image in the non-volatile memory according to a preferred embodiment of the present invention. The computing system 10 includes the web browser 120, the system initialization procedure 22, and the interconnection system 40 described above with reference to FIGS. 1 and 2. In a preferred embodiment, the computing system 10 is a personal computer having a basic configuration with a display terminal 180 and using a variant of the Windows™ operating system. The display terminal 180 includes a display screen 180a, a keyboard 180b and a point and click device 180c.

The ATM/ADSL adapter 250 is an adapter for connecting to a digital subscriber line communications system. The digital subscriber line system provides high-speed access to the network 80 over the general switched telephone network. In ATM/ADSL, data is transferred in fixed length data cells according to the Asynchronous Transfer Mode protocol.

The ATM/ADSL adapter 250 includes a resident processor 252, a bus interface 260, an I/O port system 262, a buffer 258 and the non-volatile memory 160. The non-volatile memory 160 in the ATM/ADSL adapter 250 of FIG. 3 includes an electrically-erasable programmable read-only memory (EEPROM) 254 and a field-programmable gate array (FPGA) 256. In the present context, the resident processor 252 is said to be resident because the components that comprise the processor are physically located and operate on the ATM/ADSL adapter 250 itself.

The resident processor 252 may include a general-purpose microprocessor, a digital signal processor (DSP), a combination of processors, or any other suitable processing system. The resident processor 252 provides processing resources for resident functions, or functions that are performed resident to the ATM/ADSL adapter 250. The EEPROM 254 and the FPGA 256 store a memory image comprising the program and data used by the ATM/ADSL adapter 250 to perform the resident communications functions of the ATM/ADSL adapter 250.

The resident communications functions performed on the ATM/ADSL adapter 250 control the buffer 258, the bus interface 260, and the I/O port system 262 to send or receive data packets communicated over the network 80. When performing receiving functions, the data packets are received at the I/O port system 262 and transferred to the buffer 258. The buffer 258 provides temporary storage for the data packets before being transferred to the bus interface 260 for delivery to the ATM/ADSL adapter driver 230 via the interconnection system 40. When performing sending functions, the data packets are transferred from the bus interface 260 to the I/O ports 262 for communication to the network 80.

The ATM/ADSL adapter driver 230 includes a version manager 232 having a device version detector 240, a memory image converter 242 and an updated image copy 234. The version manager 232 is called during the system initialization procedure 22, preferably, when the ATM/ADSL adapter driver 230 is being initialized. The version manager 232 is shown in FIG. 3 as a software component of the ATM/ADSL adapter driver 230. In an alternative embodiment, the version manager 232 may be separate from the ATM/ADSL adapter driver 230 as shown in FIG. 2.

The version manager 232 may include a query to the user requesting whether to verify the device version. The user may acknowledge the query in the affirmative to verify the device version, or in the negative to verify the device version at a later time.

The device version detector 240 verifies the device version by checking the device version 162 stored in the non-volatile memory 160. The device version detector 240 may send a bus message having a request for the device version 162 over the interconnection system 40 to the ATM/ADSL adapter 250. The device version detector 240 uses the standard interface provided by the operating system for the ATM/ADSL adapter driver 230 to communicate the request to the ATM/ADSL adapter 250. The ATM/ADSL adapter 250 sends a bus message having data including the device version back to the device version detector 240.

The device version detector 240 compares the device version with an updated device version 238. The updated device version 238 may be stored in a configuration parameter table 236, which is a data structure that contains information about the version of the ATM/ADSL adapter 250 with which the ATM/ADSL adapter driver 230 operates. If the device version corresponds with the updated device version, the ATM/ADSL adapter driver 230 continues to operate. If the device version does not correspond with the updated device version, the version manager 232 converts the memory image in the non-volatile memory 160 to the updated memory image.

The version manager 232 calls the memory image converter 242 to convert the memory image in the non-volatile memory 160 to the updated memory image. The memory image converter 242 converts the memory image in the non-volatile memory 160 by downloading, or programming, the data that comprises the updated memory image to the non-volatile memory 160. In one embodiment, the memory image converter 242 includes an internal copy of the updated memory image 234 and downloads the copy to the non-volatile memory 160. In an alternative embodiment, an external copy of the updated memory image 182 is used by the memory image converter 242 to determine the data that is to be downloaded to the non-volatile memory 160 to convert it to the updated memory image. The external copy of the updated memory image 182 may be stored as a configuration file in the main file storage of the computing system 10.

The image converter 242 may download or program the copy of the updated memory image 234 using the programming procedures of the type of non-volatile memory 160 being programmed. For example, the EEPROM 254 may be programmed by a process in the ATM/ADSL adapter 250 that controls the program functions on the EEPROM 254 devices. The program functions include setting the program pin to the program voltage while transferring the updated memory image to the locations of the EEPROM 254. In the FPGA 256, the programming process may require that the power to the ATM/ADSL adapter 250 be shut down.

A graphical user interface (GUI) configuration application 184 may be included in the computing system 10 to permit the user to invoke the version manager 232 after the system initialization procedure 22 has been performed. The user may start the GUI configuration application 184 in the same way other applications are started. For example, an icon associated with the GUI configuration application 184 may be displayed on a display terminal 180. The user may click on the icon to start the GUI configuration application 184.

Once started up, the GUI configuration application 184 may output screen messages on the display screen 180a that indicate a status. The GUI configuration application 184 may call the ATM/ADSL adapter driver 230 with a request to use the version manager 232 to check the version of the ATM/ADSL adapter 250.

Alternatively, the version manager 232 may operate independently of the ATM/ADSL adapter 250; and the GUI configuration application 184 may call the version manager 232 directly. The version manager 232 may use the ATM/ADSL adapter driver 230 to access information from the ATM/ADSL adapter 250 or from its configuration table.

The version manager 232 checks the device version 162 and updates the memory image in the non-volatile memory 160 if the device version 162 does not correspond with the updated device version 236. During the process performed by the version manager 232, the GUI configuration application 184 may display status messages on the display screen 180a. The GUI configuration application 184 may also include queries for information from the user, such as whether to continue with the image conversion when the versions are incompatible, or whether to restart the system if the image conversion requires that power to the ATM/ADSL adapter 250 be turned off.

FIG. 3 shows a preferred embodiment of the present invention as practiced in an asynchronous transfer mode/ asynchronous digital subscriber line adapter. However, those of ordinary skill in the art will appreciate that any type of device may advantageously be used with the present invention.

Figure 4:
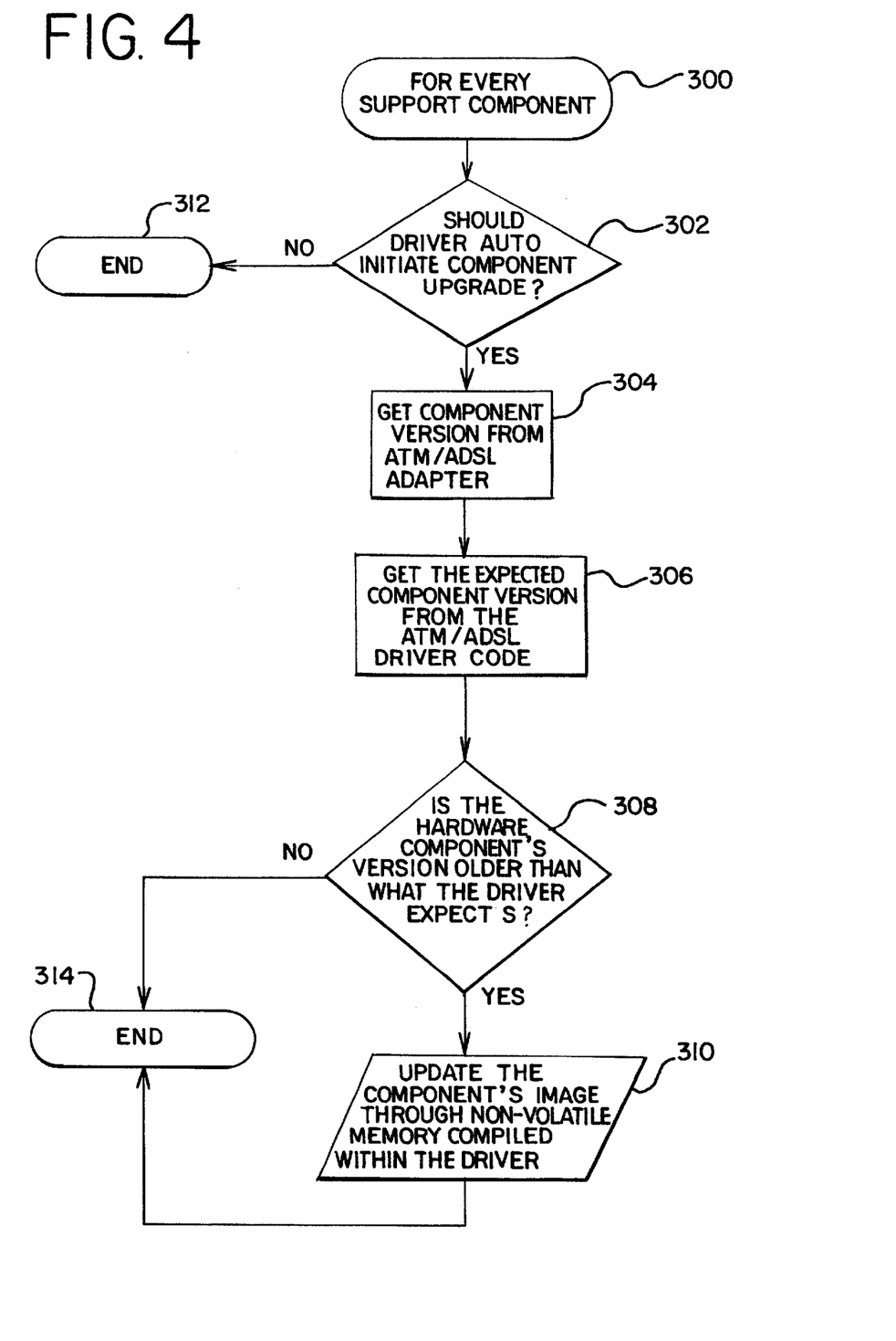
FIG. 4 is a flowchart of a method for detecting and updating a device in the computing systems in FIG. 3.

FIG. 4 is a flowchart of a method of updating non-volatile memory in the system in FIG. 3. Because the non-volatile memory 160 may include more than one component, the method is carried out during initialization of the ATM/ADSL adapter driver for each component as shown in step 300. At decision block 302, the ATM/ADSL adapter driver may ask the user via a GUI query whether to update the non-volatile memory. If the user clicks 'no', the initialization of the driver continues to the end at step 312. If the user clicks 'yes', the version manager retrieves the device version at step 304. At step 306, the updated device version is retrieved from the configuration information of the driver. The updated device version is compared with the retrieved device version at decision block 308. If the device version indicates that the device is older than the device expected by the driver, the non-volatile memory image is converted to the updated memory image at step 310. The process ends at step 314 and the system initialization is completed. If at decision block 308 the device version indicates that the device is up to date, or the device expected by the driver, the process ends at step 314.

Figure 5:
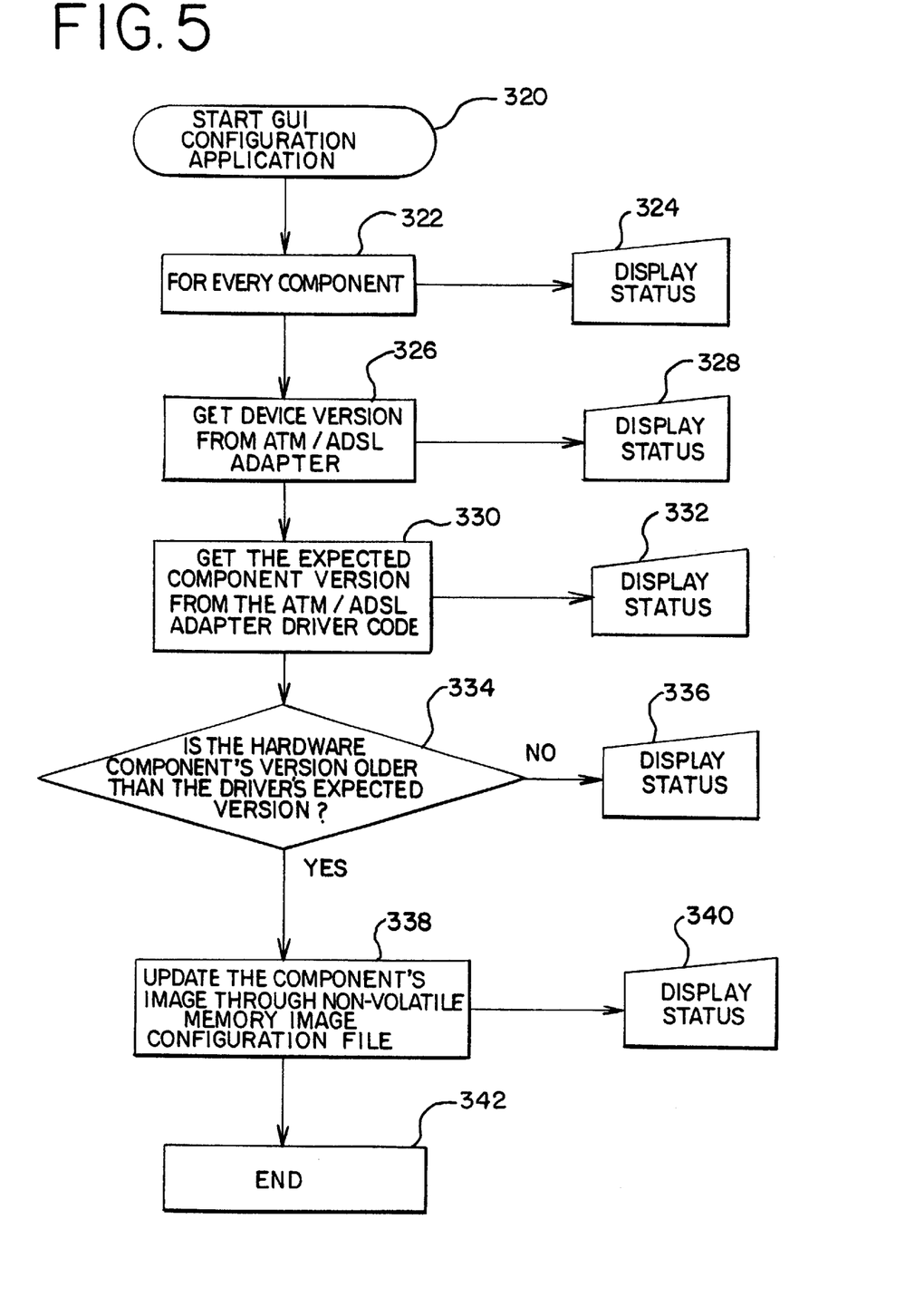
FIG. 5 is a flow chart of a method for detecting and updating a device in the computing system in FIG. 3 using a configuration application.

The user may manually request that the non-volatile memory be updated by executing the GUI configuration application at step 320 in FIG. 5. The application performs the configuration process for each non-volatile memory component as shown at step 322. The component identification may be displayed to the user on the display screen at step 324. At step 326, the device version is retrieved from the ATM/ADSL adapter. The version retrieved may be displayed to the user on the display screen at step 328. The expected, updated device version, is retrieved from the configuration information data structure in the adapter driver at step 330. The version retrieved may be displayed on the display screen at step 332.

At decision block 334, the device version is compared to the updated device version. If the versions are the same, the user is provided with the feedback on the display screen at step 336. If the device version is older than the updated device version, the non-volatile memory image is updated to the updated memory image at step 338. In a preferred embodiment, the update is carried out using a configuration file having the program and data image that is to be updated in the non-volatile memory image. However, in alternative embodiments, the memory image may compiled within the adapter driver similar to the method shown in FIG. 4. The status of the update may be displayed to the user at step 340. The process ends for each non-volatile memory component at step 342.

The methods in FIGS. 4 and 5 are described with respect to an ATM/ADSL adapter, however, any device may be similarly updated. The advantage of using the methods in FIGS. 4 and 5 is that versions of non-volatile memory components in a device may be updated to a version expected by the device driver automatically with little or no user input.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:
1. A system for updating a non-volatile programmable memory in a device, the system comprising, in combination:
   a memory image in the non-volatile programmable memory, the memory image comprising resident data to perform a plurality of device functions;
   a device type identifier stored in the non-volatile programmable memory to identify the device as being one of a plurality of device types including an updated device type having an updated device type identifier, the memory image being an updated image when the device type identifier matches the updated device type identifier;
   a copy of the updated image stored in a memory medium of the computing system;
   a device driver stored in the memory medium of the computing system, the device driver operable to control the device when the memory image is the updated image;
   a version manager having a device version detector for detecting whether the device type identifier matches the updated device type identifier; and
   a memory image converter that stores the updated image in the non-volatile programmable memory when the device type identifier does not match the updated device type identifier.

2. The system as claimed in claim 1 wherein the device is a card connected to a bus system in a computing system.

3. The system as claimed in claim 1 wherein the non-volatile programmable memory includes a memory device selected from a group consisting of an erasable programmable read-only memory, an electrically erasable programmable read-only memory, a flash memory and a field programmable gate array.

4. The system as claimed in claim 1 wherein the device includes a resident processor and the memory image includes a device program for performing a plurality of device functions.

5. The system as claimed in claim 4 wherein the device is an asynchronous transfer mode over asymmetric digital subscriber line (ATM/ADSL) adapter card and the plurality of device functions include communications functions that provide communications with a data network.

6. The system as claimed in claim 5 wherein the ATM/ADSL adapter card is installed in a computing system using the Windows® Operating System.

7. The system as claimed in claim 1 wherein:
   the copy of the updated image is an internal image compiled in with the device driver; and wherein
   the memory image converter in the version manager incorporates the updated image by programming the updated image in the non-volatile memory.

8. The system as claimed in claim 1 wherein:
   the copy of the updated image is an external image stored in a configuration file in the memory medium of the computing system; and wherein
   the memory image converter in the version manager is operable to incorporate the updated image by the memory image in the non-volatile memory to the external image in the configuration file and modifying the memory image to match the updated image.

9. The system as claimed in claim 1 further comprising:
   a user interface having a user input for prompting the memory image converter to begin detecting whether the memory image is the updated image, the user interface displaying a plurality of configuration update results.

10. The system as claimed in claim 9 wherein the configuration update results include a status indicative of an updated status when the non-volatile memory includes an updated memory image version and an updated status when the non-volatile memory has been updated by the configuration update controller to include the updated memory image version.

11. The system as claimed in claim 9 wherein the configuration update results include a list identifying a plurality of updated portions of the memory image.

12. An improved device driver for controlling a device in a computing system, the device including a non-volatile programmable memory for storing a memory image, the memory image having device data, the device having a device version for identifying the device as being one of a plurality of versions including an updated device version, the memory image being an updated image when the device version matches the updated device version, the improvement comprising, in combination:

a copy of the updated image stored in a memory medium of the computing system, the copy of the updated image being accessible to the device driver;

a version manager having a device version detector for detecting whether the device version matches the updated device version; and     a memory image converter incorporating the updated image in the non-volatile programmable memory when the device version does not match the updated device version.

13. The improvement of claim 12 wherein:

the copy of the updated image in the device driver is an internal image integral to the device driver; and wherein the memory image converter in the version manager incorporates the updated image by programming the updated image to the non-volatile memory.

14. The improvement of claim 12 wherein:

the copy of the updated image in the device driver is an external image stored in a configuration file; and wherein the memory image converter in the version manager is operable to incorporate the updated image by comparing the memory image in the non-volatile memory to the external image in the configuration file to modify the memory image.

15. The improvement of claim 12 further comprising:

a user interface having a user input for prompting the device version detector to begin detecting whether the device version is the updated device version, the user interface further comprising a user output for displaying a plurality of configuration update results.

16. The improvement of claim 15 wherein the configuration update results include a status indicative of an updated status when the non-volatile memory includes an updated image and an updated status when the non-volatile memory has been updated by the configuration update controller to include the updated image.

17. The improvement of claim 15 wherein the configuration update results include a list identifying a plurality of updated portions of the memory image.

18. A method for updating a memory image in a non-volatile programmable memory in a device, the method comprising the steps of:

initializing a device driver for controlling the device;

detecting a device version in the memory image to determine if the device version is an updated device version; and     updating the memory image in the non-volatile programmable memory to store the updated device version.

19. A method as claimed in claim 18 further comprising the steps of:

prior to the step of detecting the memory image version, starting an initialization of the device driver for controlling the device; and     after the step of updating the memory image, completing the initialization of the device driver.

20. A method as claimed in claim 18 wherein the step of updating the memory image in the non-volatile programmable memory includes the step of programming an updated memory image from the device driver to the non-volatile programmable memory.

21. A method as claimed in claim 18 wherein the step of updating the memory image in the non-volatile programmable memory includes the steps of:

comparing the memory image in the non-volatile programmable memory with a configuration file;

determining portions of the memory image to update; and updating selected portions of the memory image to generate the updated memory image.

22. A method as claimed in claim 18 wherein the step of detecting the device version in the memory image is performed after a step of prompting by a user starting a configuration application.

23. A method as claimed in claim 22 wherein the step of prompting by the user starting the configuration application comprises inputting an update command and wherein the step of inputting the update command is performed by the user executing the configuration application using a graphical user interface.

24. A machine readable medium having stored therein instructions for causing a central processing unit on a computing system to execute the method of claim 18.

25. A method for updating a memory image in a non-volatile programmable memory in a device in a computing system, the method comprising the steps of:

initializing a device driver for controlling the device, wherein during initialization of the device, requesting whether to update the device during initialization;

starting a configuration application for updating the memory image in the non-volatile memory;

detecting a device version in the memory image to determine if the device version is an updated device version;

updating the memory image in the non-volatile programmable memory to store the updated device version; and     controlling the device using the updated device version.

26. A method for updating a memory image in a non-volatile programmable memory in a device in a computing system, the method comprising the steps of:

starting a configuration application for updating the memory image in the non-volatile memory;

detecting a device version in the memory image to determine if the device version is an updated device version;

updating the memory image in the non-volatile programmable memory to store the updated device version by programming an updated memory image from a device driver to the non-volatile programmable memory; and     controlling the device using the updated device version.

* * * * *